July 25, 1939.  C. F. CRUMB ET AL  2,166,942
TRACTOR MOWER
Filed June 19, 1937  2 Sheets-Sheet 1

Inventors
C. F. Crumb
and G. E. Hilblom
By V. F. Lavayne Atty.

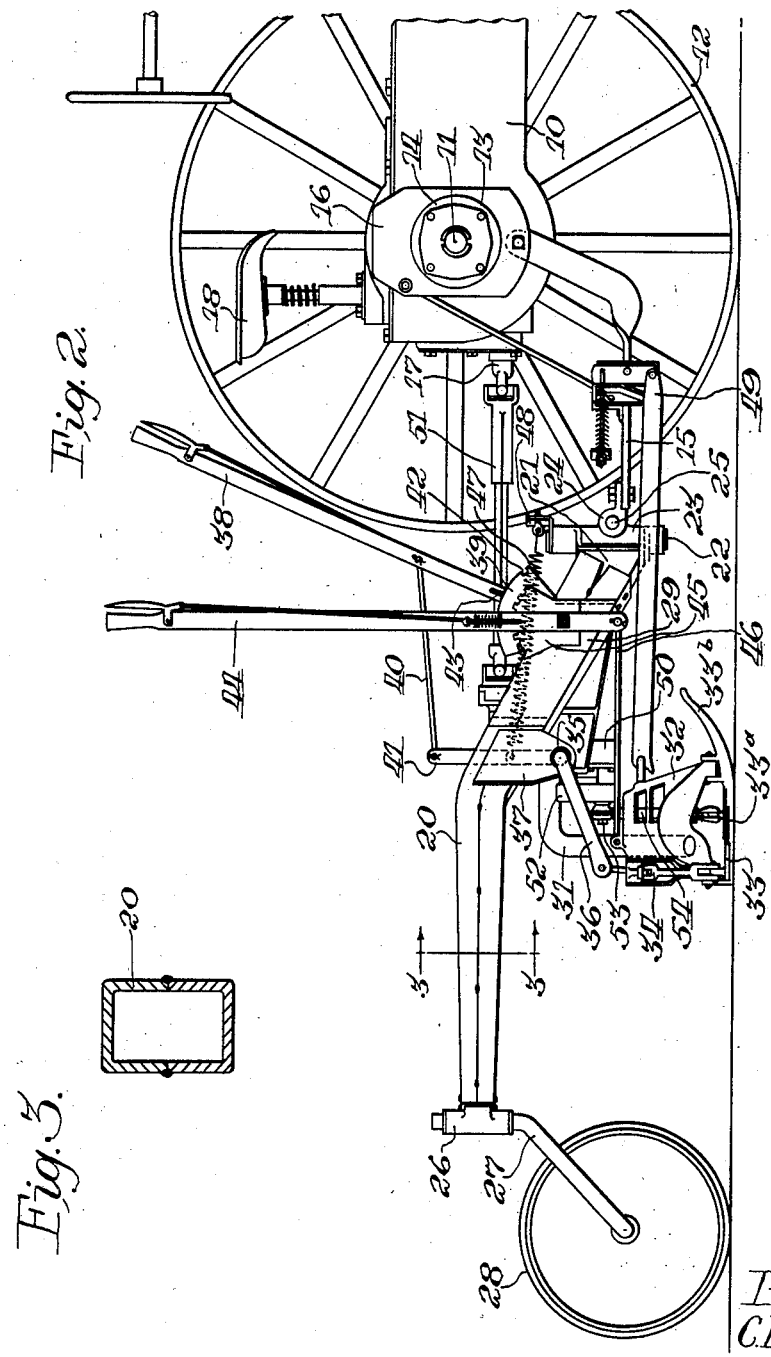

Patented July 25, 1939

2,166,942

UNITED STATES PATENT OFFICE 2,166,942

TRACTOR MOWER

Charles F. Crumb and Samuel E. Hilblom, Chicago, Ill., assignors to International Harvester Company, a corporation of New Jersey Application June 19, 1937, Serial No. 149,170

20 Claims. (Cl. 56—25)

REISSUED
MAR 4 - 1941

This invention relates to a tractor mower and more particularly to an improved frame construction for supporting a mower, and to an improved means for connecting the frame structure and mower to the tractor.

The present invention particularly adapts a mower to be supported by a frame and connected to a tractor for operation over uneven terrain, such as is found in irrigated fields. These fields are usually surrounded by raised portions near their edges. As is well known to those skilled in the art, these raised edge portions or borders, as they are called, are provided as an aid to irrigation. However, when a mower is to be operated over the field, difficulty is experienced in obtaining a clean cut when the tractor is operated over the abrupt rises created by the junction of the borders with the field. Therefore, it is desirable to provide a frame structure connected to the tractor that will support cutting mechanism in a manner permitting free vertical movement thereof through rather wide limits as the tractor mower is operated over the uneven terrain. It is also desirable to have a sturdy light weight frame structure, as it is found a mower supported by this type of frame is more suitable to the conditions encountered. Former designs of tractor connected mowers included frames that were adapted for connection to only certain types of tractors. These types of mowers usually combined a more or less complicated construction for connecting the frame structure to the drawbar of the tractor. However, it is found desirable to provide a universal mower of a type adapted to be readily connected to any type of tractor.

The principal object of the invention is to provide a new and improved frame structure for supporting a mower and which is constructed in a manner suitable for attachment to the drawbar or draft connection of any tractor.

An important object of the invention is to provide a single frame member adapted to be supported at its forward end on the drawbar of the tractor and at its rear end on a ground engaging means such as a caster wheel.

Another important object is to provide a mower frame that can be connected at a single point to the drawbar of any type of tractor.

Another important object is to connect the frame to the drawbar in a manner permitting both vertical and horizontal movement with respect thereto.

Still another object is to provide a single frame member tubular in construction and so designed as to support a mower therebelow for free vertical movement of the mower through rather wide limits as the tractor and mower are operated over uneven terrain.

Still another object is to provide the connection between the frame and the tractor drawbar in such a manner that horizontal and vertical movement is permitted about substantially intersecting axes.

And still another object is to provide this connecting means as a bracket including both pivotal axes and adapted to be readily attached to the drawbar of any type tractor.

Briefly and specifically, these and other objects are achieved by providing in a tractor mower a single frame member adapted to be connected to the drawbar or other draft connection of a tractor at a single point and carrying cutting mechanism therebelow. The frame is supported at its rear end on a caster wheel and at its forward end is pivotally connected to the drawbar of a tractor at a single point of connection for pivotal movement about both horizontal and vertical axes. The single frame member is preferably formed tubular in cross section and comprises two longitudinal halves secured together by welding. This frame extends diagonally rearwardly from its point of connection on the tractor drawbar, and the caster wheel carrying the rear end thereof is substantially in longitudinal alignment with the mower shoe. This construction provides for free vertical movement of the cutting mechanism through rather wide limits as the tractor and caster wheel follow the contour of the ground.

A further understanding of the objects and desirable features of the invention may be had from the following description taken in conjunction with the accompanying sheets of drawings, in which:

Figure 2 is a side elevational view of the same with the near wheel of the tractor removed; and, Figure 3 is an enlarged cross sectional view taken on the line 3—3 of Figure 2 showing a preferred tubular construction of the single frame member.

Figure 1:
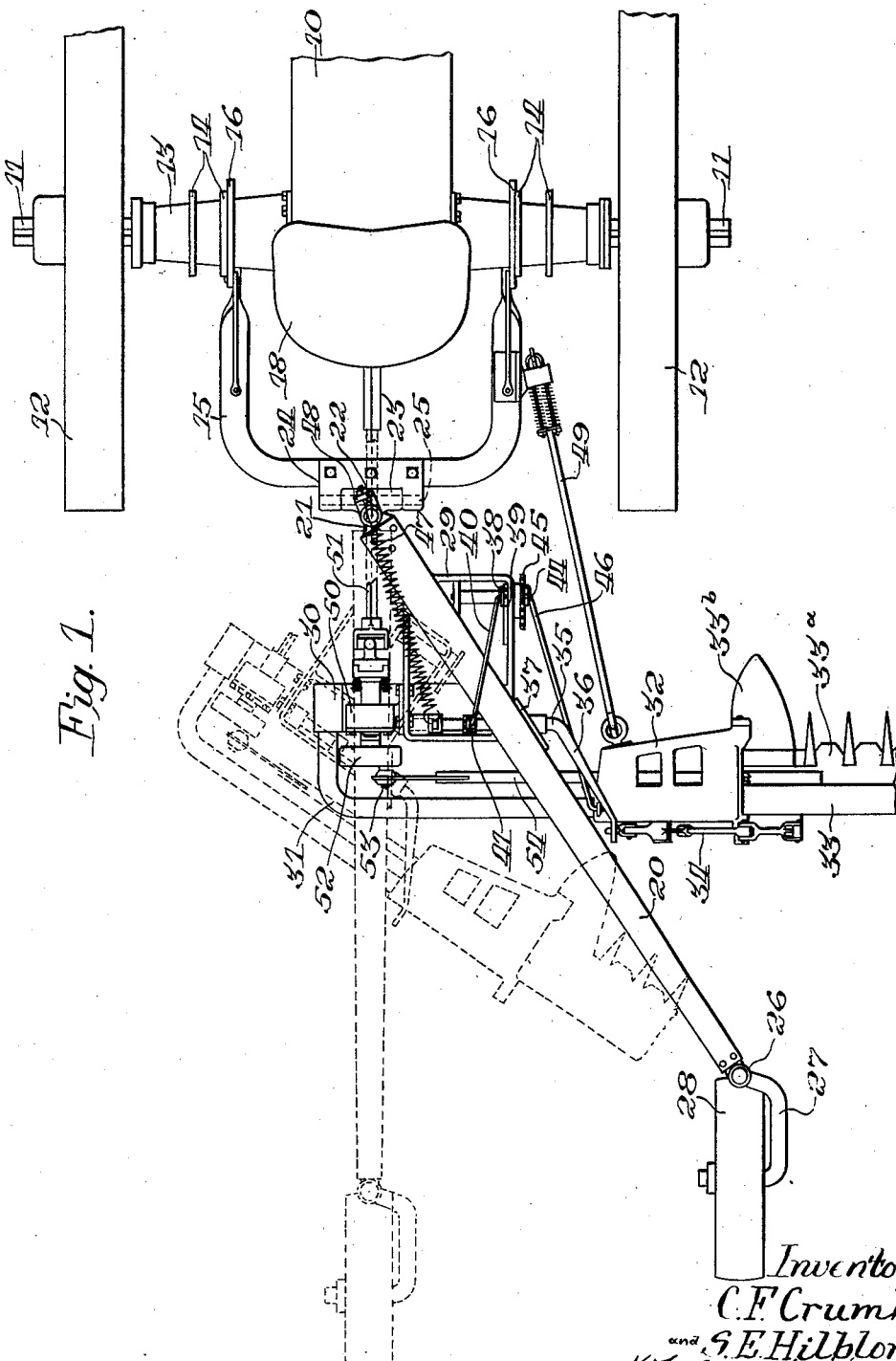
Figure 1 is a plan view of the new and improved frame structure connected to the drawbar of a tractor, only that portion of the tractor being shown as is necessary to illustrate the invention.

It will be understood that the tractor to which the mower is connected may be of any type, the one herein disclosed being shown and described merely for the sake of illustration. The tractor, then, comprises a main body portion 10 having rear drive axles 11 extending from each side thereof and carrying drive wheels 12. Each axle 11 is enclosed in an axle housing 13 secured at each side of the main body portion 10. The axle housings are provided with spaced attaching flanges 14. A drawbar or draft element 15 is rigidly carried by a pair of quickly attachable plates 16 secured to the inner attaching flange 14 on each axle housing 13. The tractor is provided with a central, longitudinally extending power take-off shaft 17 which is driven by the transmission of the tractor, not shown. A usual operator's station or seat 18 is provided at the rear of the tractor.

A mower comprising a frame structure and cutting mechanism carried thereby is pivotally connected to the drawbar 15 at a single point of connection for movement about both a horizontal and a vertical axis. The frame structure of the mower includes a single frame member 20, preferably formed tubular in cross section, and comprises two longitudinal halves U-shaped in cross section and secured together along their edges at their open sides preferably by welding. This construction provides a sturdy light weight frame member.

At its forward end the frame member 20 is provided with a bracket 21 in the form of a casting which is secured by a vertical pivot pin 22 to a second bracket 23. A third bracket 24 is rigidly secured to the drawbar 15 of the tractor and is pivotally connected on a horizontal axis to the bracket 23 by a pivot pin 25. At its rear end, the single frame member 20 is provided with a cast bracket 26 in which is journaled an axle 27 of a caster wheel 28. In this manner, the frame member 20 is pivotally connected to the drawbar 15 of the tractor for horizontal swinging movement about the pivot pin 22 and for vertical movement about the horizontal pivot pin 25.

Mower cutting mechanism is carried by the frame member 20 and includes a secondary frame structure 29 rigidly secured as by welding to the member 20. A comparatively large, cast bracket 30 is rigidly supported on the frame structure 29 at its stubbleward side and pivotally carries a coupling bar 31 on a longitudinally extending horizontal axis. The coupling bar 31 is bent at right angles and extends transversely of the frame member 20 having rockably carried at its grassward end a yoke 32. A cutter bar 33, movably carrying a knife 33a and supported on a shoe 33b, is hingedly associated with the yoke 32 and is provided with lifting linkage 34. A transverse rockshaft 35 having a rearwardly extending crank arm 36 is rockably carried by the frame structure 29 and by a bracket plate 37 secured to the frame member 20 at its grassward side. The rearward end of the arm 36 is operably connected to the lifting linkage 34 for raising the cutter bar 33, as will be presently described.

Forwardly of the rockshaft 35, the supporting structure 29 carries lifting mechanism including a lifting lever 38 and a quadrant member 39. A link 40 operably connects the lifting lever 38 to an upstanding arm 41 rigidly carried by the rockshaft 35. Forward movement of the lifting lever 38 rocks the shaft 35 and raises the cutter bar 33 for transport or other purposes. It will be noted that the upper periphery of the lifting quadrant 39 is continuous, being formed with but a single notch 42. In this manner, the mower cutting mechanism is permitted to float freely, independently of the frame member 20 as the mower shoe 33b follows the contour of the ground. However, the lever 38 may be locked in position when the cutter bar 33 is raised, by means of the notch 42 cooperating with latch means 43 on the lever.

Substantially in alignment with the lifting mechanism, the secondary frame structure 29 carries a lever 44 cooperating with a quadrant 45 and connected by a link 46 to the yoke 32 for adjusting the tilt of the shoe 33b and cutter bar 33a. It will be noted that both levers 38 and 44 are within easy reach of the operator's station or seat 18 on the tractor. A balancing or helper spring 47 is connected at one end to an arm on the rockshaft 35 and at the other end to an angle bracket 48 carried on the cast bracket 21 at the axis of the pivot 22 for aiding the lift mechanism in raising the cutter bar 33. A releasable latch means, or its equivalent, is provided to maintain the cutting mechanism in operative position and comprises a release draft-bar 49 releasably connected at one end to the drawbar 15 and at the other end to the yoke 32. This latch means may be of any conventional construction and comprises an overload release connection which is utilized to permit the cutting mechanism to be swung back about the pivot 22 when the cutter bar 33 strikes an obstruction, as shown in dotted line position in Figure 1.

The secondary frame structure 29 carries driving mechanism for reciprocating the knife 33a of the cutting mechanism. This driving mechanism is enclosed in a housing 50 and is connected by flexible, telescoping shafting 51 to the power take-off shaft 17 of the tractor. A fly wheel 52 is driven thereby and is provided with an eccentric 53 on which is mounted a pitman 54 which reciprocates the knife 33a.

From the above description, it will be apparent that an improved frame structure has been provided which may be readily attached to any type of tractor and is particularly adapted for operation under conditions where the ground contour is extremely uneven such as operation over the borders in irrigated fields hereinbefore referred to. The cutting mechanism is permitted to move vertically within rather wide limits, independent of the frame 20 as the shoe 33b follows the contour of the ground. In as much as the lifting mechanism is locked only when the cutter bar 33 is raised, there can be no interference of the lifting mechanism with the aforesaid vertical movement of the cutting mechanism. Similarly, there is no interference between the adjusting lever 44 and the shoe 33b as the connections at each end of the link 46 are loosely pivotal.

The bracket structures 21, 23 and 25 being pivotally interconnected as they are, provide for particularly greater relative movement between the tractor and the frame 20 as the tractor wheel and caster wheel encounter abrupt changes in the ground contour. As hereinbefore mentioned, the balancing spring 47, by virtue of its connection to the bracket 48 at the pivot axis of the pin 22, maintains its tension regardless of the position of the cutting mechanism with respect to the frame or tractor, thus facilitating, among other things, reconnection of the cutting mechanism after it has been released.

It will be readily apparent that the preferred construction illustrated and described will permit operation of the mower under adverse conditions, thus insuring a clean cut with no remaining standing crop. The construction provided also permits attachment of the mower to a tractor of any type and has been designed toward that end. It will be understood that changes in detail, such as utilizing draft connections other than a drawbar, and in any other part of the construction may be made without detracting from the advantages obtainable with the above described preferred construction. These and other changes and modifications may be made without departing from the spirit and scope of the invention as indicated in the following claims.

What is claimed is:

1. In a tractor mower in which the tractor includes a drawbar, the combination with the drawbar of a mower comprising a frame and cutting mechanism carried thereby, said frame being pivotally supported on and connected to the drawbar at a single point of connection for pivotal movement about both a horizontal and a vertical axis, said axes substantially intersecting, and means for normally holding the cutting mechanism in operative position.

2. In a tractor mower in which the tractor includes a drawbar, the combination with the drawbar of a mower comprising a rearwardly and diagonally extending frame and cutting mechanism carried thereby, a ground engaging means supporting the rear end of the frame, said frame being pivotally supported on and connected at its forward end to said drawbar at a single point of connection for movement about both a horizontal and a vertical axis, said axes substantially intersecting, and means for normally holding the cutting mechanism in operative position.

3. In a tractor mower in which the tractor includes a power take-off shaft and a drawbar, the combination with the drawbar of a single frame member pivotally connected to the drawbar at a single point of connection and extending rearwardly and diagonally therefrom, a ground engaging means for supporting the rearward end of said frame, mower cutting mechanism carried by the frame, and driving mechanism for the cutting mechanism driven by the power take-off shaft.

4. In a tractor mower in which the tractor includes a drawbar, the combination with the drawbar of a single frame member pivotally connected to the drawbar at a single point of connection for movement about both a horizontal axis and a vertical axis and extending rearwardly and diagonally therefrom, a ground engaging means for supporting the rearward end of said frame, mower cutting mechanism carried by the frame, and means for holding the cutting mechanism in operative position.

5. In a tractor mower in which the tractor includes a drawbar, the combination with the drawbar of a single frame member pivotally connected to the drawbar at a single point of connection for movement about both a horizontal axis and a vertical axis and extending rearwardly and diagonally therefrom, a ground engaging means for supporting the rearward end of said frame, mower cutting mechanism carried by the frame, and releasable means for holding the cutting mechanism in operative position, said means being releasable to permit the cutting mechanism to swing about the aforesaid vertical axis when the cutter bar strikes an obstruction.

6. In a tractor mower in which the tractor includes a drawbar, the combination with the drawbar of a mower comprising a rearwardly and diagonally extending frame and cutting mechanism carried thereby, means for pivotally supporting and connecting the forward end of said frame on and to the drawbar at a single point of connection, and a ground engaging means supporting the rear end of the frame, said ground engaging means being disposed rearwardly of and substantially in alignment with the inner end of the cutting mechanism.

7. In a tractor mower in which the tractor includes a drawbar, the combination with the drawbar of a mower comprising a frame and cutting mechanism carried thereby, said frame being pivotally supported on and connected to said drawbar at a single point of connection for movement about both a horizontal axis and a vertical axis, said axes substantially intersecting, and releasable latch means for holding the cutting mechanism and frame in operative position with respect to the tractor, said latch means being releasable to permit the release of the cutting mechanism and frame from the aforesaid operative position about the aforesaid vertical axis when the cutter bar strikes an obstruction.

8. In a tractor mower in which the tractor includes a drawbar, the combination with the drawbar of a mower comprising a rearwardly and diagonally extending frame and cutting mechanism carried thereby, a ground engaging means supporting the rear end of said frame, said frame being pivotally supported on and connected at its forward end to said drawbar at a single point for movement about both a horizontal axis and a vertical axis, said axes substantially intersecting, and releasable means for holding the cutting mechanism and frame in operative position with respect to the tractor, said means being releasable to permit the release of the cutting mechanism and frame from the aforesaid operative position about the aforesaid vertical axis when the cutter bar strikes an obstruction.

9. In a tractor mower in which the tractor includes a drawbar, the combination with the drawbar of a mower comprising a frame and cutting mechanism carried thereby, said frame being pivotally supported on and connected to the drawbar at a single point of connection for movement about both a horizontal axis and a vertical axis with respect to the drawbar, and means for holding the cutting mechanism and frame in operative position.

10. In a tractor mower in which the tractor includes a drawbar, the combination with the drawbar of a mower comprising a rearwardly and diagonally extending frame and cutting mechanism carried thereby, a ground engaging means for supporting the rear end of the frame, and pivotal means for supporting and connecting the forward end of the frame on and to the drawbar at a single point of connection, said pivotal means providing for both horizontal and vertical movement of the frame with respect to the drawbar about closely spaced axes.

11. In a tractor mower in which the tractor includes a power take-off shaft and a drawbar, the combination with the drawbar of a mower comprising a single frame member and cutting mechanism carried thereby, means for pivotally connecting the frame to the drawbar at a single point of connection, and driving means for driving the cutting mechanism from the power take-off shaft.

12. In a tractor mower in which the tractor includes a drawbar, the combination with the drawbar of a single tubular frame member pivotally connected to said drawbar at a single point of connection and extending rearwardly and diagonally therefrom, a caster wheel supporting the rear end of said frame member, mower cutting mechanism carried by said frame, and means for holding said cutting mechanism in operative position.

13. In a tractor mower in which the tractor includes a drawbar, the combination with the drawbar of a single tubular frame pivotally connected to said drawbar at a single point of connection and extending rearwardly and diagonally therefrom, said frame member comprising two longitudinal halves secured together by welding, a caster wheel movably carried in a bracket secured to the frame member for supporting the rear end of said frame member, mower cutting mechanism carried by said frame member, and means for holding said cutting mechanism in operative position.

14. In a tractor mower in which the tractor includes a drawbar, the combination with the drawbar of a mower comprising a single rearwardly and diagonally extending frame member pivotally connected to said drawbar, a caster wheel supporting the rear end of the frame, a coupling bar movably associated with the frame member and extending transversely therebelow, a yoke carried by said coupling bar, a cutter bar hingedly associated with said yoke, a rockshaft movably carried in brackets secured to the frame member, lifting connections between the rockshaft and the cutting bar, lifting means for rocking the rockshaft for lifting the cutter bar, and means connected to the aforesaid yoke and to the drawbar for holding said cutter bar in operative position.

15. In a tractor mower in which the tractor includes a rearwardly extending power take-off shaft and a drawbar, the combination with the drawbar of a mower comprising a rearwardly and diagonally extending frame and cutting mechanism carried thereby and including drive mechanism, a caster wheel supporting the rear end of the frame, means for pivotally supporting and connecting the forward end of the frame on and to the drawbar at a single point of connection for movement of the frame with respect to the drawbar about both a horizontal and a vertical axis, said vertical axis being located substantially in vertical alignment with the center-line of the power take-off shaft, flexible drive shafting connecting the power take-off shaft and the mower drive mechanism, and means for holding the aforesaid cutting mechanism in operative position.

16. In a tractor mower in which the tractor includes a rearwardly extending power take-off shaft and a drawbar, the combination with the drawbar of a mower comprising a rearwardly and diagonally extending frame and cutting mechanism carried thereby and including drive mechanism, a caster wheel supporting the rear end of the frame, means for pivotally supporting and connecting the forward end of the frame on and to the drawbar at a single point of connection for movement of the frame with respect to the drawbar about both a horizontal and a vertical axis, said horizontal axis being located substantially in horizontal alignment with the center of the caster wheel, flexible drive shafting connecting the power take-off shaft and the mower drive mechanism, and means for holding the aforesaid cutting mechanism in operative position.

17. In a tractor mower in which the tractor includes a drawbar, the combination with the drawbar of a single frame member pivotally connected at its forward end to the drawbar at a single point of connection for movement of said frame member about both a horizontal and a vertical axis with respect to the drawbar, said frame member extending rearwardly and diagonally from the drawbar, a ground engaging means supporting the rear end of said frame, cutting mechanism carried by the frame for vertical movement with respect thereto, and a balancing spring connected at one end to the cutting mechanism at its other end to a point substantially in vertical alignment with the aforesaid vertical axis.

18. In a tractor mower in which the tractor includes a drawbar, the combination with the drawbar of a mower comprising a single rearwardly and diagonally extending frame member pivotally connected to said drawbar, a caster supporting the rear end of the frame, a coupling bar movably associated with the frame member and extending transversely therebelow, a yoke carried by said coupling bar, a cutter bar hingedly associated with said yoke, a rockshaft movably carried in brackets secured to the frame member, lifting connections between the rockshaft and the cutter bar, lifting means carried on the frame member for limited free movement with respect thereto, said means being operatively associated with the rockshaft for rocking same to lift the cutter bar, and means connected to the aforesaid yoke and to the drawbar for holding said cutter bar in operative position.

19. In a tractor mower in which the tractor includes a drawbar, the combination with the drawbar of a mower comprising a frame and cutting mechanism carried thereby, said frame being pivotally supported on and connected to said drawbar at a single point of connection for movement about both a horizontal axis and a vertical axis, said axes substantially intersecting, releasable latch means for holding the cutting mechanism and frame in operative position with respect to the tractor, said latch means being releasable to permit the release of the cutting mechanism and frame from the aforesaid operative position about the aforesaid vertical axis when the cutter bar strikes an obstruction, and a balancing spring connected at one end to the cutting mechanism and at the other end to a point rearward of the drawbar.

20. In a tractor mower in which the tractor includes a drawbar, the combination with the drawbar of a mower comprising a rearwardly and diagonally extending frame and cutting mechanism floatably carried thereby, a ground engaging means supporting the rear end of the frame, said frame being pivotally supported on and connected at its forward end to said drawbar at a single point of connection for movement about both a horizontal and a vertical axis, said axes substantially intersecting, means for normally holding the cutting mechanism in operative position, and lifting means for raising the cutter bar, said lifting means being lockable only when the cutter bar is in raised position.

CHARLES F. CRUMB.
SAMUEL E. HILBLOM.